(12) United States Patent
Romanovsky et al.

(10) Patent No.: US 10,228,854 B2
(45) Date of Patent: Mar. 12, 2019

(54) STORAGE DEVICES AND METHODS FOR OPTIMIZING USE OF STORAGE DEVICES BASED ON STORAGE DEVICE PARSING OF FILE SYSTEM METADATA IN HOST WRITE OPERATIONS

(71) Applicant: SanDisk Technologies LLC, Plano, TX (US)

(72) Inventors: Leonid Romanovsky, Haifa (IL); Judah Gamliel Hahn, Ofra (IL); Joseph Robert Meza, Aliso Viejo, CA (US); Daniel Edward Tuers, Kapaa, HI (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 39 days.

(21) Appl. No.: 14/555,548

(22) Filed: Nov. 26, 2014

(65) Prior Publication Data

US 2016/0054931 A1 Feb. 25, 2016

Related U.S. Application Data

(63) Continuation-in-part of application No. 14/464,584, filed on Aug. 20, 2014, now Pat. No. 10,007,442.

(51) Int. Cl.
*G06F 12/02* (2006.01)
*G06F 3/06* (2006.01)

(52) U.S. Cl.
CPC .......... *G06F 3/0608* (2013.01); *G06F 3/0643* (2013.01); *G06F 3/0659* (2013.01); *G06F 3/0679* (2013.01); *G06F 12/0246* (2013.01)

(58) Field of Classification Search
CPC .... G06F 3/0608; G06F 3/0643; G06F 3/0659; G06F 3/0679
USPC .................................................. 711/103, 115
See application file for complete search history.

(56) References Cited

U.S. PATENT DOCUMENTS

| 6,092,154 | A | 7/2000 | Curtis et al. | |
|---|---|---|---|---|
| 7,743,038 | B1 * | 6/2010 | Goldick | G06F 17/302 707/694 |
| 7,937,393 | B2 * | 5/2011 | Prahlad | G06F 17/30528 707/705 |
| 8,775,741 | B1 | 7/2014 | de la Iglesia | |

(Continued)

OTHER PUBLICATIONS

Prabhakaran et.al. "Analysis and Evolution of Journaling File Systems" 2005 USENIX Annual Technical Conference.*

(Continued)

*Primary Examiner* — Tuan V Thai
*Assistant Examiner* — Tasnima Matin
(74) *Attorney, Agent, or Firm* — Loza & Loza, LLP; Gabriel Fitch

(57) ABSTRACT

The subject matter described herein includes processing file system metadata in host write requests to determine information about future host write operations. The information regarding future host write operations can be used by a device controller to prepare the non-volatile memory for the future host write operations. For example, the device controller may prepare the non-volatile storage device for future sequential host write access patterns or random host write access patterns depending on the content of the file system metadata. The file system metadata may also be usable to determine when it is optimal to perform memory management operations.

29 Claims, 9 Drawing Sheets

(56) References Cited

U.S. PATENT DOCUMENTS

| | | | |
|---|---|---|---|
| 2003/0188184 A1 | 10/2003 | Strongin et al. | |
| 2006/0106984 A1* | 5/2006 | Bartley | G06F 12/08 711/118 |
| 2007/0266037 A1* | 11/2007 | Terry | G06F 3/0607 |
| 2008/0320211 A1* | 12/2008 | Kinoshita | G06F 3/0616 711/103 |
| 2009/0031083 A1* | 1/2009 | Willis | G06F 11/1441 711/135 |
| 2009/0228875 A1* | 9/2009 | DeVries | G06F 11/3476 717/154 |
| 2010/0262721 A1 | 10/2010 | Asnaashari et al. | |
| 2011/0296088 A1 | 12/2011 | Duzly et al. | |
| 2011/0320685 A1 | 12/2011 | Gorobets et al. | |
| 2012/0051137 A1 | 3/2012 | Hung et al. | |
| 2012/0144092 A1 | 6/2012 | Hsieh et al. | |
| 2012/0284587 A1 | 11/2012 | Yu et al. | |
| 2012/0317335 A1 | 12/2012 | Cho | |
| 2013/0024609 A1 | 1/2013 | Gorobets et al. | |
| 2013/0080732 A1* | 3/2013 | Nellans | G06F 12/0246 711/206 |
| 2013/0086311 A1 | 4/2013 | Huang et al. | |
| 2013/0138867 A1* | 5/2013 | Craft | G06F 12/0246 711/103 |
| 2013/0191349 A1* | 7/2013 | Akirav | G06F 17/00 707/692 |
| 2013/0262533 A1* | 10/2013 | Mitra | G06F 17/30132 707/822 |
| 2013/0275672 A1 | 10/2013 | Bert | |
| 2013/0297852 A1* | 11/2013 | Fai | G11C 16/12 711/103 |
| 2014/0082324 A1* | 3/2014 | Elhamias | G06F 12/0862 711/213 |
| 2014/0149641 A1* | 5/2014 | Avila | G11C 11/412 711/103 |
| 2014/0289492 A1* | 9/2014 | Ranjith Reddy | G06F 3/0613 711/170 |
| 2014/0337560 A1 | 11/2014 | Chun et al. | |
| 2015/0199269 A1* | 7/2015 | Bert | G06F 12/0862 711/103 |
| 2015/0356020 A1 | 12/2015 | Desai et al. | |
| 2016/0026406 A1 | 1/2016 | Hahn et al. | |
| 2016/0054934 A1 | 2/2016 | Hahn et al. | |
| 2016/0246726 A1 | 8/2016 | Hahn | |

OTHER PUBLICATIONS

"Ext4 Disk Layout," https://ext4.wiki.kernel.org/index.php/Ext4_Disk_Layout, Wikipedia, pp. 1-28 (Nov. 17, 2014).

"CreateFile function," Microsoft, Windows Dev Center, https://msdn.microsoft.com/en-us/library/windows/desktop/aa363858(v=vs.85).aspx, pp. 1-20 (2008).

"NVM Express," Specification Revision 1.2, http://nvmexpress.org/wp-content/uploads/NVM_Express_1_2_Gold_20141209.pdf, pp. 1-205 (Nov. 3, 2014).

"I/O Limits: block sizes, alignment and I/O hints," Red Hat, http://people.redhat.com/msnitzer/docs/io-limits.txt, pp. 1-4 (Jan. 14, 2013).

Commonly-assigned, co-pending U.S. Appl. No. 14/977,559, for "Methods, Systems, and Computer Readable Media for Automatically and Selectively Enabling Burst Mode Operation in a Storage Device" (Unpublished filed Dec. 21, 2015).

Non-Final Office Action for U.S. Appl. No. 14/297,563 (dated Dec. 4, 2015).

Non-Final Office Action for U.S. Appl. No. 14/464,584 (dated Dec. 4, 2015).

"NVM Express Overview, " NVM Express, pp. 1-2 (copyright 2013).

"Understanding the Flash Translation Layer (FTL) Specification, " AP-684 Application Note, Intel, pp. 1-20 (Dec. 1998).

Non-Final Office Action for U.S. Appl. No. 14/464,584 (dated Nov. 18, 2016).

Notice of Allowance and Fees Due for U.S. Appl. No. 14/814,460 (dated Sep. 23, 2016).

Notice of Allowance and Fees Due for U.S. Appl. No. 14/297,563 (dated Jul. 25, 2016).

"NVM Express," Specification Revision 1.2.1, http://www.nvmexpress.org/wp-content/uploads/NVM_Express_1_2_1_Gold_20160603.pdf, pp. 1-217 (Jun. 5, 2016).

Final Office Action for U.S. Appl. No. 14/464,584 (dated Apr. 26, 2016).

Final Office Action for U.S. Appl. No. 14/297,563 (dated Apr. 13, 2016).

Non-Final Office Action for U.S. Appl. No. 14/814,460 (dated Mar. 28, 2016).

Hahn, Judah G. et al., Non-Final Office Action dated May 10, 2017 for U.S. Appl. No. 15/050,364.

Prabhakaran, et al., Analysis and Evolution of Journaling File Systems, 2005 USENIX Annual Technical Conference, pp. 105-120 (2005).

Hahn, et al., Office Action dated Aug. 25, 2017 for U.S. Appl. No. 14/464,584.

* cited by examiner

STORAGE DEVICES AND METHODS FOR OPTIMIZING USE OF STORAGE DEVICES BASED ON STORAGE DEVICE PARSING OF FILE SYSTEM METADATA IN HOST WRITE OPERATIONS

PRIORITY CLAIM

This application is a continuation-in-part of U.S. patent application Ser. No. 14/464,584 filed Aug. 20, 2014, the disclosure of which is incorporated herein by reference in its entirety.

TECHNICAL FIELD

The subject matter described herein relates to memory storage device optimization. More particularly, the subject matter described herein relates to storage devices and methods for optimizing use of storage devices based on storage device parsing of file system metadata.

BACKGROUND

When accessing storage devices, it is desirable to optimize utilization of the devices. For example, flash memory devices have memory cells with a finite number of program and erase cycles before the cells experience errors and become unusable. Frequently accessed host data should generally not be stored in such memory cells. Rather, frequently accessed host data should be stored in dynamic memory cells, i.e., cells with a comparatively larger number of program and erase cycles.

In addition, it is desirable to store data with the same anticipated host access pattern together in a memory storage device because of differences in access granularity between a host and the memory device. For example, in a flash memory device, it may not be desirable to store a temporary file that is frequently accessed in the same memory block as an image file that is infrequently accessed because accesses to the memory block that stores the temporary file would also access the memory cells that store the image file. Because the storage device only sees I/O operations that specify ranges of memory addresses, the characteristics of the data being stored or how the data will be accessed by the host in the future is not explicitly communicated to the storage device. As a result, data may be stored in suboptimal locations of the memory device.

The protocol stack through which a host system, such as a host computer, accesses a storage device is referred to as the host storage stack, commonly referred to as the file system driver. The host storage stack includes a number of layers abstracting application logic from the logical blocks that represent the storage device. These include caching layers, memory-mapped buffers, and file systems which allow an application developer to store data in files rather than managing the actual block device interface.

Over the last 30 years, the storage stack has evolved from linear-access technologies (such as tape) to random access devices that have a seek penalty (such as floppy disks and hard disk drives (HDDs)) to random-access flash devices, such as solid state drives (SSDs), which have no inherent seek penalty, but which access physically sequential data more efficiently than random-access data. As part of the abstraction, it is difficult for a storage device to define (or devise) the ideal access pattern desired by the host. In the case of flash storage devices, the device can adjust its storage strategy if the storage device has information in advance of what the host's read pattern would be for certain logical block address (LBA) sequences. As an example, if the device has information that a certain LBA range, for example, will be read sequentially at boot, it may make that range available for access before it completes internal initialization. As another example, if the device has information that that a certain LBA sequence will only hold temporary files with a lifetime of one host power cycle, it may choose particular flash regions which are tuned for lower retention or keep data destined for these LBAs in RAM. As alluded to above, most of the knowledge regarding LBA sequences is maintained in the upper layers of the host storage stack (such as the file system) and is not communicated down to the storage device.

Storage protocols such as hybrid serial advanced technology attachment (SATA) and non-volatile memory express (NVMe) include the ability for the host to create "hints", which advise the device of characteristics of specific LBA ranges. These hints do not require the device to change its behavior, but optionally allow for optimization of specific ranges. Sending hints from the host to the storage device effectively requires the cooperation of multiple parts of the storage stack, since the metadata used to determine a hint is typically abstracted away within the file system.

Although current operating systems may send hints on an extremely limited basis, such hints are not effective for solid state drive optimization. This requires new solutions that bridge the host-device gap in hinting.

One particular type of non-volatile memory in which it is desirable to optimize utilization of the storage media is NAND flash memory. A NAND flash memory is organized in terms of blocks, and each block is further divided into a fixed number of pages. A block is the basic unit for erase operations, while reads and writes are processed in the unit of one page. A page cannot be overwritten unless it is erased.

Due to the special write constraints of multi-level cell (MLC) flash memory, pages of MLC flash memory can only be written sequentially in a block and partial programming to a page is not possible. The write constraints introduce extra overhead to writes over flash memory and make existing flash transition layer (FTL) designs (e.g., implementing different address translation tables) and other flash memory management schemes lack efficiency.

One existing problem associated with storage devices based on flash memory is that the flash memory management schemes do not have awareness of the file system of the host and thereby introduce overhead caused by write operations of different sizes, including overhead caused by live page copying of valid pages from victim blocks containing invalid pages to free pages in other blocks, such that system performance is significantly affected. Currently, host write operations are not managed in the storage device based on the memory locations of memory blocks that are yet to be written to the file system.

File system metadata in host write operations may provide an indication of where data will be written in the future to the non-volatile storage device. File system metadata signifying the beginning and end of data to be written to a storage device may allow for the storage device to perform memory management operations between write operations. However, as stated above, such file system metadata, while known to the host, is typically not known to the non-volatile storage device.

Accordingly, there exists a need for storage devices and methods for optimizing use of storage devices based on storage device parsing of file system metadata in host write operations.

OVERVIEW

The subject matter described herein includes processing file system metadata in host write requests to determine information about future host write operations. The information regarding future host write operations can be used by a device controller to prepare the non-volatile memory for the future host write operations. For example, the device controller may prepare the non-volatile storage device for future sequential host write access patterns or random host write access patterns depending on the content of the file system metadata. The file system metadata may also be usable to determine when it is optimal to perform memory management operations.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

The subject matter described herein includes methods, systems, and computer readable media for automatically deriving hints from accesses to a storage device and from file system metadata and for optimizing utilization of the storage device based on the hints. The operations described herein are performed at the storage device level, for example, using a hardware or firmware hint derivation and memory utilization optimization module that automatically detects patterns in data that is written to a storage device and derives hints from the patterns regarding how data will likely be accessed by a host. The hint derivation and memory utilization optimization module may also utilize frequency of accesses to memory locations and file system metadata to derive hints and to determine how to best optimize utilization of storage device resources.

Figure 1:
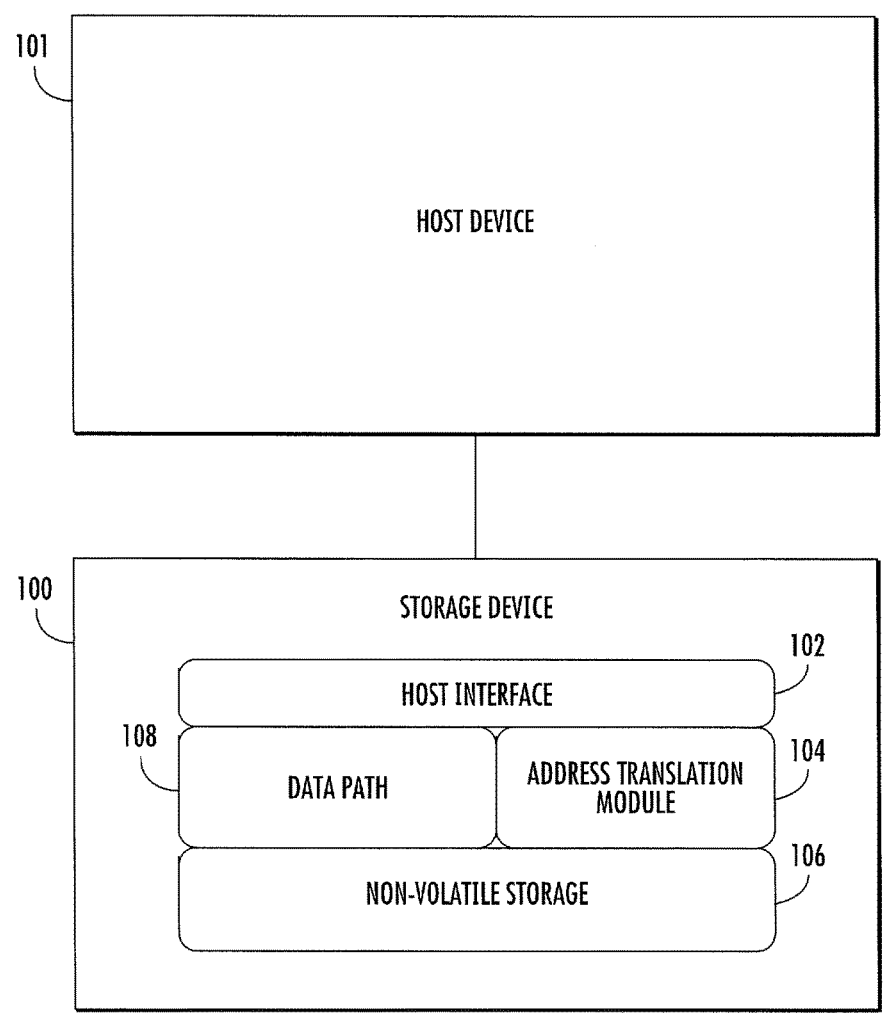
FIG. 1 is a block diagram illustrating an exemplary operating environment for the subject matter described herein.

FIG. 1 is a block diagram of an exemplary operating environment in which the hint derivation and storage device utilization optimization methods described herein may be used. Referring to FIG. 1, a storage device 100 provides non-volatile storage for a host device 101. Storage device 100 may be any suitable device that incorporates non-volatile memory and that allows access to that memory by a host device. In one example, storage device 100 may be a NAND flash device. However, other storage devices may also be used within the scope of the subject matter described herein. For example, storage device 100 may be a NOR flash device, a solid state drive that incorporates NOR and/or NAND flash memory, or a device that combines solid state storage with disk storage.

Storage device 100 may include hardware, software, and firmware components. For example, storage device 100 typically includes a storage controller that controls access by host device 101 to non-volatile memory storage. As described above, storage device 100 may also include hardware or firmware components that implement hint derivation and storage device utilization optimization as described herein. These components will be described in more detail below.

In the illustrated example, storage device 100 includes a host interface 102 for interfacing with host device 101. Host interface 102 may be any suitable interface for handling I/O operations between host device 101 and non-volatile memory. For example, host interface 102 may be a SATA interface, a peripheral component interface express (PCIe) interface, or any other suitable interface for receiving I/O commands from a host system. An address translation module 104 translates from the address space used by the host to the address space used by storage device 100 to access non-volatile storage 106. In one example, host device 101 may use logical addressing by specifying logical block addresses (LBAs) in I/O operations to storage device 100, storage device 100 may use physical addressing to specify memory locations, and address translation module 104 may translate between the logical address space and the physical address space.

Non-volatile storage 106 may comprise the physical memory cells where data is stored. For example, in the case of flash memory, non-volatile storage 106 may include NAND or NOR flash memory cells in two-dimensional, three-dimensional, or combinations of two-dimensional and three-dimensional configurations. As stated above, non-volatile storage 106 may also include one or more disk storage devices. Storage device 100 further includes a data path 108 that communicates data from host device 101 to non-volatile storage 106 and from non-volatile storage 106 to the host. Data path 108 may include data buffers and error detection and correction modules for ensuring data integrity. In addition, as will be described in detail below, data path 108 may also include hint derivation and memory utilization optimization.

Figure 2:
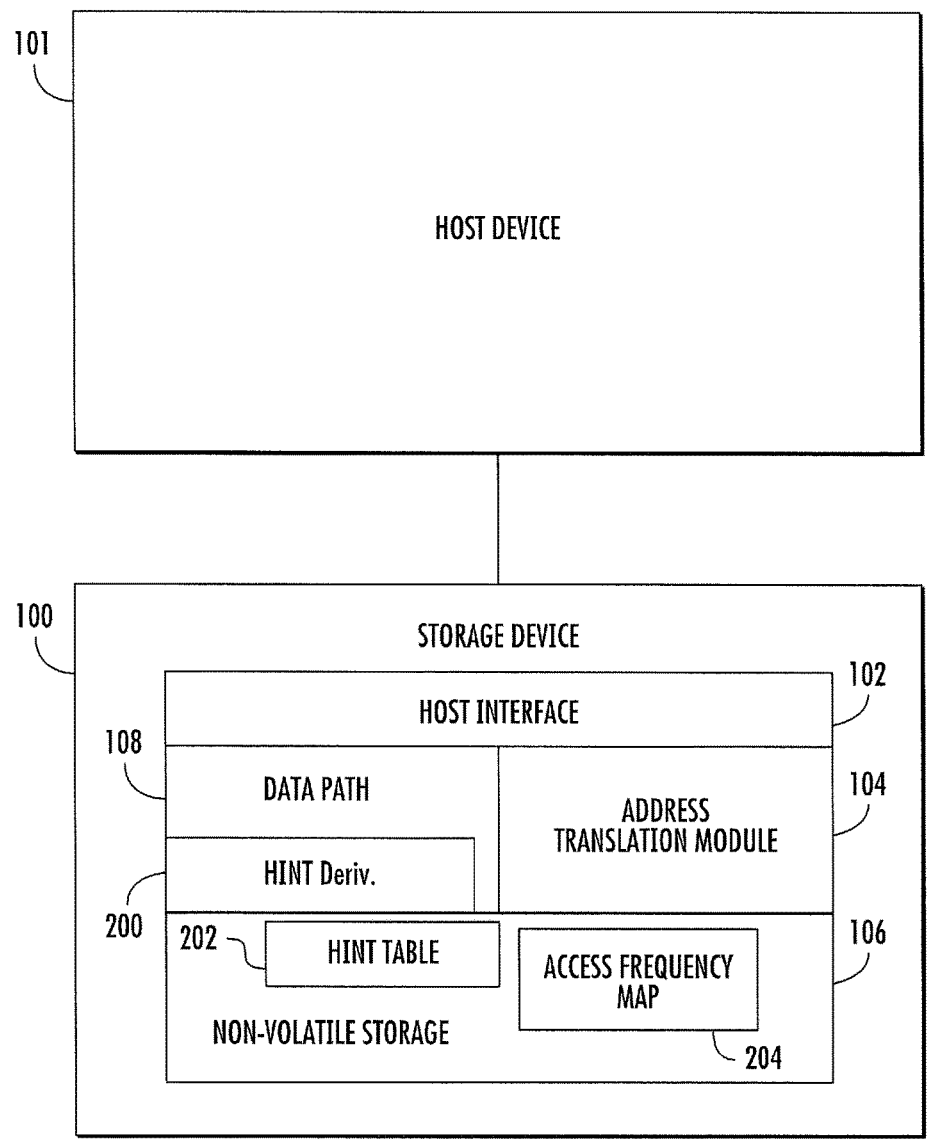
FIG. 2 is a block diagram of exemplary components of a storage device with a hint derivation and memory utilization optimization module, hint tables, and a access frequency map according to an embodiment of the subject matter described herein.

FIG. 2 is a block diagram of storage device 100 and host device 101 in FIG. 1 where storage device 100 includes a hint derivation and memory utilization optimization module 200 for deriving hints from accesses to storage device 100 and from file system metadata and utilizing the hints to optimize utilization of non-volatile storage 106. In FIG. 2, hint derivation and memory utilization optimization module 200 may comprise a hardware or firmware component of storage device 100 that resides on the storage device side of host interface 102 and analyzes incoming data for patterns. Hint derivation and memory utilization optimization module 200 may also detect the access frequency for LBAs in I/O requests from host device 101. Hint derivation and memory utilization optimization module 200 may also derive hints from file system metadata. Hint derivation and memory utilization optimization module 200 may use the hints to optimize utilization of non-volatile memory. Examples of optimizations that may be performed will be described below.

A hint table 202 stores LBA ranges and corresponding hints that indicate how the corresponding LBA range will likely be accessed by host system 101 in the future. In one example, the hints may be file types, which provide an indication of how the files will subsequently be accessed by the host system. Access frequency map 204 stores LBA ranges and frequencies of access for the ranges. Access frequency map 204 may be in the form of statistics, counters, logs, or any other direct or derived mechanism for recording access frequencies for different LBAs. Hint table 202 and access frequency map 204 may be stored in any suitable location within storage device 100. For example, hint table 202 and access frequency map 204 may be stored in non-volatile storage 106 or in cache memory that is separate from non-volatile storage 106. In addition, hint table 202 and access frequency map 204 may be combined into a single data structure so that an access frequency is specified for each LBA range entry in hint table 202.

Figure 3:
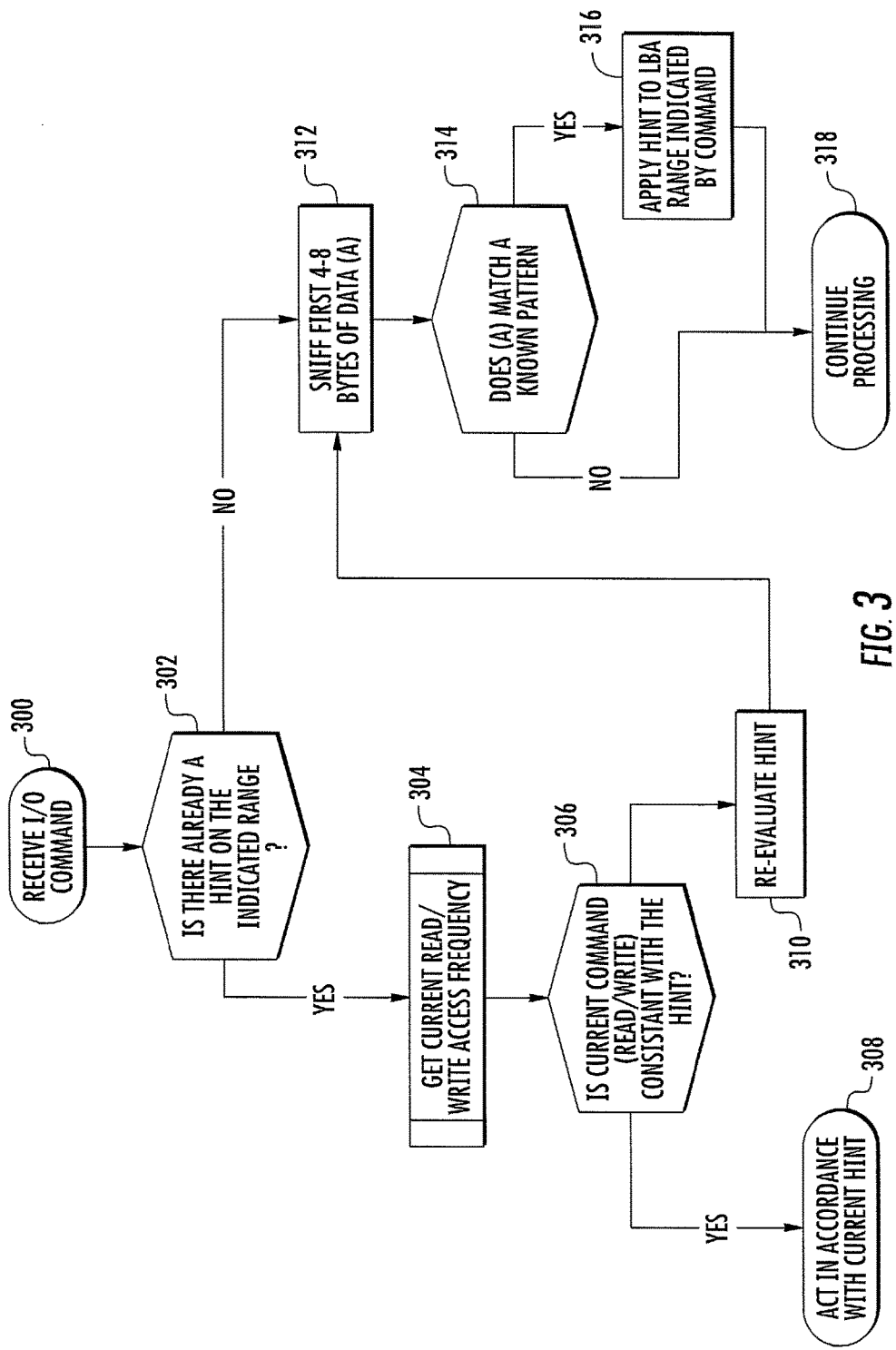
FIG. 3 is a flow chart illustrating an exemplary process for in-line hint derivation and memory utilization optimization according to an embodiment of the subject matter described herein.

FIG. 3 is a flow chart illustrating exemplary steps for in-line hint derivation and corresponding memory utilization optimization according to an embodiment of the subject matter described herein. By "in-line", it is meant that hints associated with the anticipated host memory access pattern are derived by the storage device while performing a host initiated I/O operation. In-line hint derivation and corresponding memory optimization is believed to be beneficial because the anticipated type of memory access for a specific LBA range in an I/O request can be used to determine where to initially store data from the I/O request in the case of a write operation. However, the subject matter described herein is not limited to in-line hint derivation and memory utilization optimization. Hint derivation may be performed asynchronously with respect to I/O operations. Asynchronous hint derivation may not allow optimization of how data is initially stored. However, the data can be subsequently moved to optimize utilization of storage device 100.

Referring to FIG. 3, in step 300, an I/O command is received. The I/O command may be a read command or a write command received by hint derivation and memory utilization optimization module 200. In step 302, it is determined whether or not a hint already exists for the LBA range in the I/O command. In order to determine whether a hint exists for the range specified in the I/O command, hint derivation and memory utilization optimization module 200 may extract the LBA range from the I/O command sequence and perform a lookup in hint table 202 to determine whether an entry for the LBA range is present in hint table 202. Table 1 shown below illustrates exemplary entries that may be present in hint table 202:

TABLE 1

Exemplary Hint Table Entries

| LBA Range | Hint |
| --- | --- |
| 0x00000000-0x3FFFFFFF | JPEG Image File |
| 0x40000000-0x400001F3 | Executable File |
| 0x50000000-0x8FFFFFFF | Swap File |

In Table 1, the left hand column includes LBA ranges corresponding to previous I/O operations by host device 101 for which hints have been derived. The right hand column includes corresponding hints. In the illustrated example, the hints are file types which provide insight as to how the data may be accessed by the host in the future. For example, the first entry in the hint table indicates that the LBA range stores a JPEG image file. A JPEG image file may be a photo that is likely to be written only once and then read sequentially. Such a file is preferably stored in static memory cells that have a relatively lower number of remaining program and erase cycles, as it is unlikely that even for read operations the JPEG image file will be frequently accessed. In addition, the JPEG image file may be distributed across flash memory in a manner that is optimal for sequential read access. It may also be desirable to store the JPEG image file with other JPEG image files that were created around the same time, as accesses to JPEG image files that relate to the same event are likely to occur together.

The second entry in Table 1 is an executable file. Similar to a JPEG image file, an executable file is likely to be written once and then read sequentially when the corresponding program is executed. An executable file may therefore be stored or distributed across memory cells in a manner that is optimal for sequential read access. The executable file may be stored in static or dynamic regions of non-volatile storage 106 depending on the type of program and anticipated frequency of access. For example, if the program is a web browser which is likely to be frequently accessed, the web browser may be stored in a dynamic portion of non-volatile storage 106. If however, the program is a back-up program that runs only once per week, the program may be stored in a static region of non-volatile storage 106.

The third entry in Table 1 includes a hint that indicates that the file is a system swap file. A swap file is typically frequently accessed because it enables an operating system to use secondary storage devices, such as storage device 100, to simulate extra memory. When the system runs low on memory, it swaps a section of system Random Access Memory (RAM) that an idle program is using onto the storage device to free up memory for other programs. A swap file is preferably stored in a dynamic region of non-volatile storage 106 in light of the frequent access and low latency requirement of a swap file. A dynamic region of non-volatile storage 106 may, in addition to having a large number of remaining program and erase cycles, be a region with relatively low access latency, as compared with other regions of non-volatile storage 106.

Returning to step 302 in FIG. 3, if a hint is present, control proceeds to step 304 where the current read or write access frequency is determined. This step may be performed by hint derivation and memory utilization optimization module 200 accessing access frequency data stored for the LBA range in the I/O operation in access frequency map 204. In step 306, it is determined whether the current command is consistent with the hint. Determining whether the current command is consistent with the hint may include examining the command type and/or the access frequency data to determine whether the hint needs to be reevaluated. For example, if the hint stored for a particular LBA range indicates that the file stored is JPEG image file and the command is a write command, the hint may require reevaluation, as it is unlikely that a JPEG file will be overwritten by the host once it is written the first time. In the same example, if the command for the LBA range is a read command for a previously stored JPEG file, then the command is consistent with the current hint. If the current command is consistent with the hint, control proceeds to step 308, where an action is performed in accordance with the current hint. Performing an action in accordance with the current hint may include carrying out the I/O operation and updating the associated access frequency data. Continuing with the JPEG file example, the read command may be executed. If the current command is not consistent with the hint, control proceeds to step 310 where hint re-evaluation begins.

As part of hint re-evaluation, in step 312, the first four bytes of data in the command are analyzed. In step 314, it is determined whether the data matches a known pattern. Table 2 shown below illustrates different patterns that may be analyzed in a Macintosh (MAC)- or Windows-based file system.

TABLE 2

Windows File System Patterns

| Pattern | Hint |
|---|---|
| "FILE" | NTFS MFT entry |
| "PK" | ZIP compressed file (including JAR files, Android APK files, and compressed document files) |
| "RCRD", "RSTR" | NTFS log metadata |
| 0xFE 0xED 0xFA | Mach-O executable |
| "HIBR" | Hibernate data |
| "MZ" | Windows or UEFI executable |
| 00 00 00 18 66 74 79 70 00 00 00 1C 66 74 79 70 | MPEG-4 video file |
| "ID3" | ID3v2-tagged MP3 file |
| "MDMP" | Windows minidump file |
| "PAGEDUMP" | Windows pagedump file |
| 0x89, "PNG" | PNG Image file format |
| 0x42 0x4D | BMP Image file format |
| "GIF" | GIF Image file format |

In the examples in Table 2, the patterns in the left-hand column correspond to file type in the right-hand column. The file types can be used by storage device 100 to determine how that file will be accessed. For example, if the file is an executable file, it is known that executable files are relatively static. That is, they are typically written once to non-volatile storage, not modified, but may be completely erased and replaced. Thus, an executable file may be written to a static or portion of non-volatile storage. In another example, if the data contains the pattern "PK", or is determined to be an image file format, or is determined to be of particular audiovisual file formats, then the file may be determined to be a compressed file. A compressed file is not likely to require recompression and thus may be stored in static portion of non-volatile storage 106.

Continuing with step 314, it is determined whether the first 4 to 8 bytes of data in the data or payload portion of the I/O command sequence matches a known pattern. If the data matches a known pattern, control proceeds to step 316 where a hint is applied to the logical block address range indicated by the I/O command. Applying the hint may include storing the derived hint for the LBA range in the hint table and treating the data in accordance with the identified file type to optimize utilization of the memory storage device. If the hint does not match a known pattern, control proceeds to step 318 where processing is continued. Continuing the processing may include completing the I/O command and updating the access frequency for the LBA range.

Figure 4:
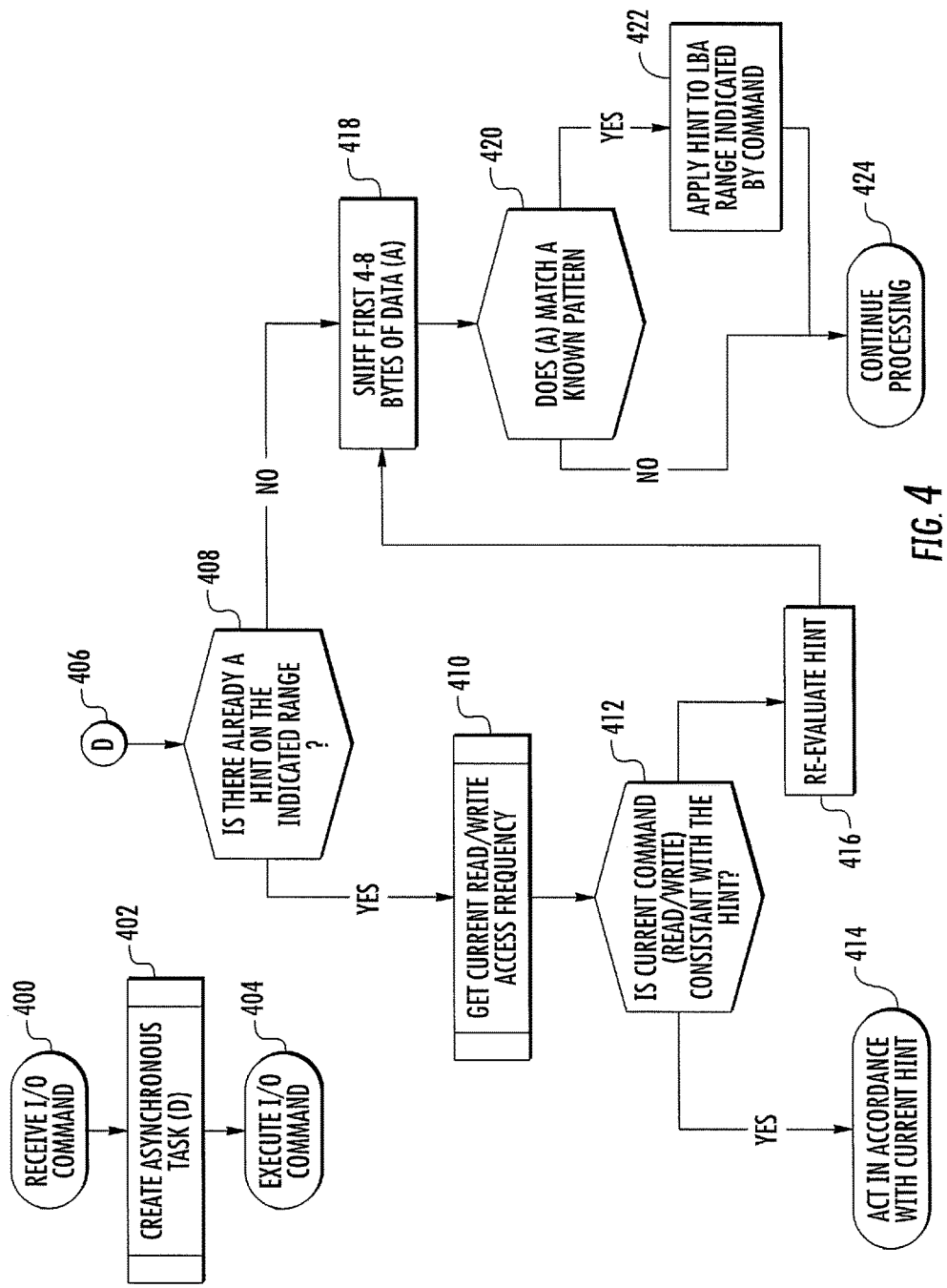
FIG. 4 is a flow chart illustrating an exemplary process for asynchronous hint derivation and memory utilization optimization according to an embodiment of the subject matter described herein.

As stated above, the subject matter described herein is not limited to deriving hints in-line, although such derivation is desirable because it allows any storage device optimizations to be performed when data is initially stored in non-volatile storage 106. The subject matter described herein also includes deriving hints asynchronously, i.e., performing the I/O operations and deriving hints asynchronously from the I/O operations. Deriving hints asynchronously is likewise beneficial to ensure repeated optimization of storage resources. FIG. 4 is a flow chart illustrating asynchronous hint derivation according to an embodiment of the subject matter described herein. Referring to FIG. 4, in step 400, an I/O command is received. The I/O command may be a read command or a write command regarding a specific LBA range. In step 402, an asynchronous task "D" is created to derive the hint for the I/O command. Creating the asynchronous task may include spawning a thread or process that analyzes the data in the I/O command sequence and any previously stored hints. In step 404, the I/O command is executed independently of the process that derives and acts on the hint. Referring to step 406, asynchronous task D begins its execution. The asynchronous task D executes steps 408-424 to derive the hint and apply the hint. Steps 408-424 are the same as steps 304-318 described above with respect to FIG. 3, with the exception that applying the hint (step 414 or 426) occurs independently of the current I/O operation. For example, applying hints may include marking the LBA ranges in the hint table such that when NAND maintenance operations, read look ahead, or other logical operations optimizing the data are utilized, the hint is available and is used as a method of making decisions about the data. For example, if the hint indicates that the data is temporary, it may be skipped in relocation decisions. Alternatively, if the data is expected to be heavily read but not written often, it may be grouped together with other "hot read" data to reduce read scrub copies of data which is relatively static.

As stated above, hint derivation may also occur by parsing file system metadata. File system metadata refers to data that is written by the file system to non-volatile storage to characterize files. File system metadata may be parsed for hint derivation as it is written to storage device 100, during storage device idle time, or opportunistically during maintenance operations that access the physical blocks in which the metadata is stored. File system metadata typically includes the following information about each file (all attributes are present in NTFS, HFS+, and the ext4 file system):

Access times (last access, last modification, creation time)
Filename
Directory structure
Extent map (map of file offsets to LBA ranges)
In some file systems (such as NTFS and HFS+), the extent map may include resident portions in a central file (called the catalog file in HFS+ and the MFT in NTFS), as well as a non-resident extension used for additional extent maps in severely fragmented files. Depending on internal device resources, storage device 100 may elect not to de-reference non-resident extents into hints.

Filename parsing works based on common usage patterns associated with file extensions or directory trees. For example, the Windows operating system uses the "Program Files" and "Program Files (x86)" directories to store executable resources, which are typically static. Furthermore, executables in Windows tend to have an extension of "EXE" or "DLL". Correspondingly, Mac OS X uses directories with the extension ".app" to store executables. (The actual executables in Mac OS X do not have an identifying extension.) Temporary files have a ".tmp" extension or are in a directory called "tmp" or "Temporary Internet Files". Internet browser cache files (which are also short-lived) may have identifying characteristics such as brackets in the filename, enclosing a single digit.

Figure 5:
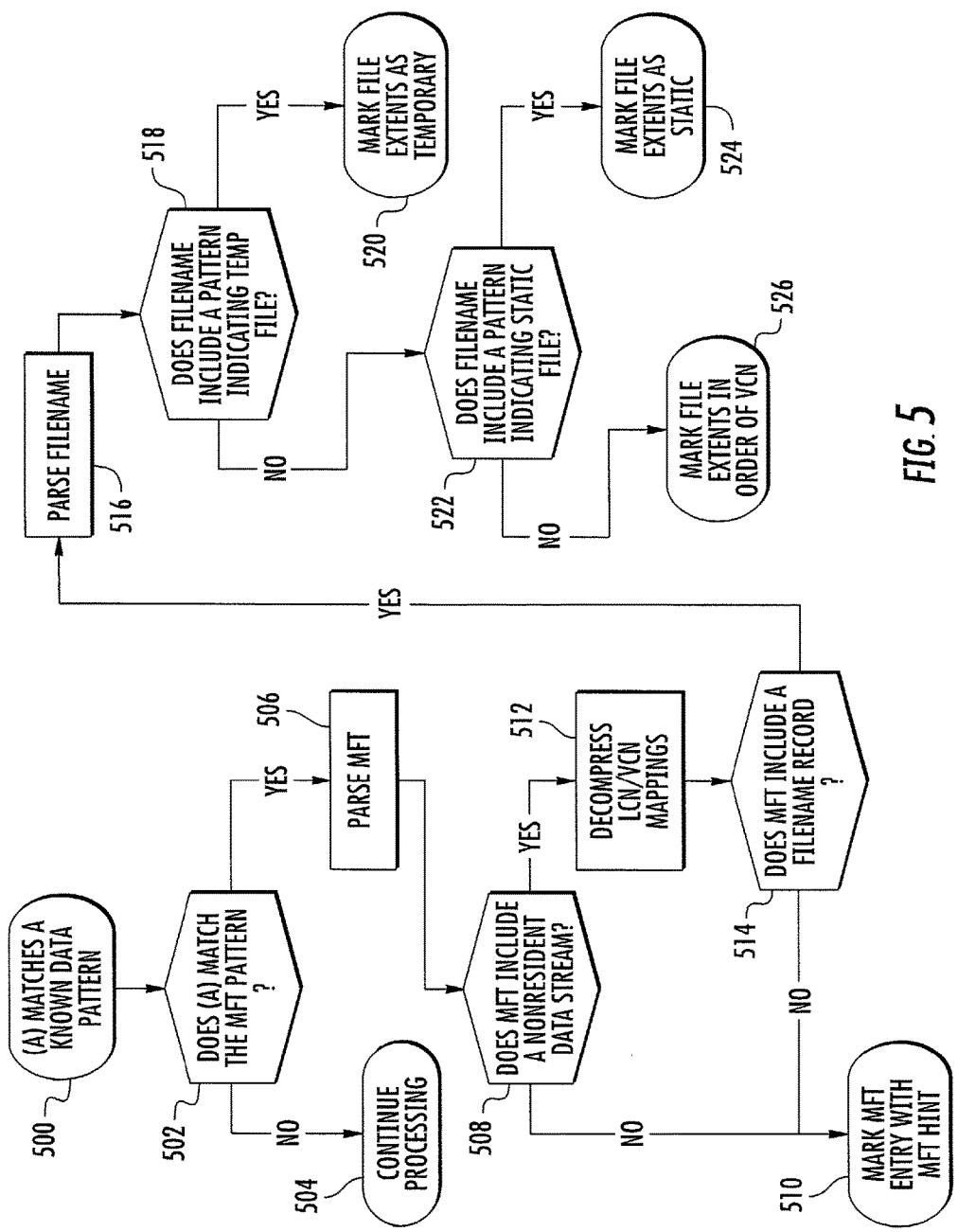
FIG. 5 is a flow chart illustrating an exemplary process for parsing file names in a master file table according to an embodiment of the subject matter described herein.

FIG. 5 illustrates hint derivation by file name parsing according to an embodiment of the subject matter described herein. In step 500, it is determined whether data in an I/O command sequence received by storage device 100 matches a known data pattern. In step 502, it is determined whether the data matches the MFT pattern. As illustrated by the first entry in Table 2, the MFT pattern is the characters "FILE". Thus, if the data parsed from the I/O operation includes the characters "FILE", then the I/O operation may be determined to be a write to the MFT table. If the operation does not match the MFT pattern, control proceeds to step 504 where processing is continued. Continuing the processing may include performing another type of hint derivation, such as based on last written and last read attributes maintained by the file system as will be described in more detail below.

In step 502, if the data matches the MFT pattern, control proceeds to step 506, where the MFT is parsed. Parsing the MFT includes locating the MFT entry corresponding to the I/O operation. Parsing the MFT continues in step 508, where it is determined whether the MFT entry stores a non-resident data stream. A non-resident data stream is a file whose location is specified in the MFT entry, but which is stored external to the MFT. A resident data stream is a file that is stored in the MFT entry. Accordingly, a write to the MFT for a resident file is a write to the file. Thus, if the MFT entry has a resident file, control proceeds to step 510 where the MFT entry is marked with a hint indicating that the entry includes an MFT resident file.

Returning to step 508, if the MFT entry includes a non-resident data stream, i.e., a pointer to one or more locations outside of the MFT that stores the corresponding file, control proceeds to step 512 where the logical cluster number/virtual cluster number (LCNNCN) mappings that indicate storage locations for a non-resident file are decompressed. In step 514, it is determined whether the MFT entry includes a file name record. If the MFT entry does not include a file name record, control returns to step 510 where the entry is marked with an MFT hint. An MFT hint may explicitly identify the entry as an MFT entry.

If the MFT entry includes a file name record, control proceeds to step 516 where the file name is parsed. File name parsing continues in step 518 where it is determined whether the file name includes a pattern indicating a temp file. File names for temp files vary per operating system. In a Windows-based operating system, a temp file may end with the suffix ".tmp" or may include closed brackets that surround a single number. If the file name pattern indicates a temp file, control proceeds to step 520 where the file extents that store the file are marked as temporary. Marking the extents as temporary may include inserting hints in the MFT table that marks the extents as temporary or adding entries to the hint table that mark the LBA ranges corresponding to the file extents or containing a temp file.

Returning to step 518, if the file name does not include a pattern identifying the file as temporary, control proceeds to step 522 where it is determined whether the file name includes a pattern identifying a static file. As described above, examples of static files are executable files and sometimes image files. If the file name includes a pattern identifying the file as static, control proceeds to step 524 where the extents are marked as static. If the file name does not include a pattern indicating a static file, control proceeds to step 526 where the extents are marked in the order specified by the virtual cluster numbers in the MFT table. The purpose of ordering the extents allows the storage device to know the order of data in the file so that the device can reorder the file for optimal host access. Reordering the file may include storing the extents of the file in different memory blocks so that they can be read out in parallel.

As stated above, another approach to parsing file system metadata is to parse last written and last read attributes in the file system and to combine these attributes with correctable error count rates or with internal counters in order to determine the access frequency of the read and optimize read scrub algorithms. Correctable error rates would correlate with increased read activity in some storage types and may be augmented by device based historical data collected on reads and writes to extents that map to files that are expected to be heavily accessed.

Figure 6:
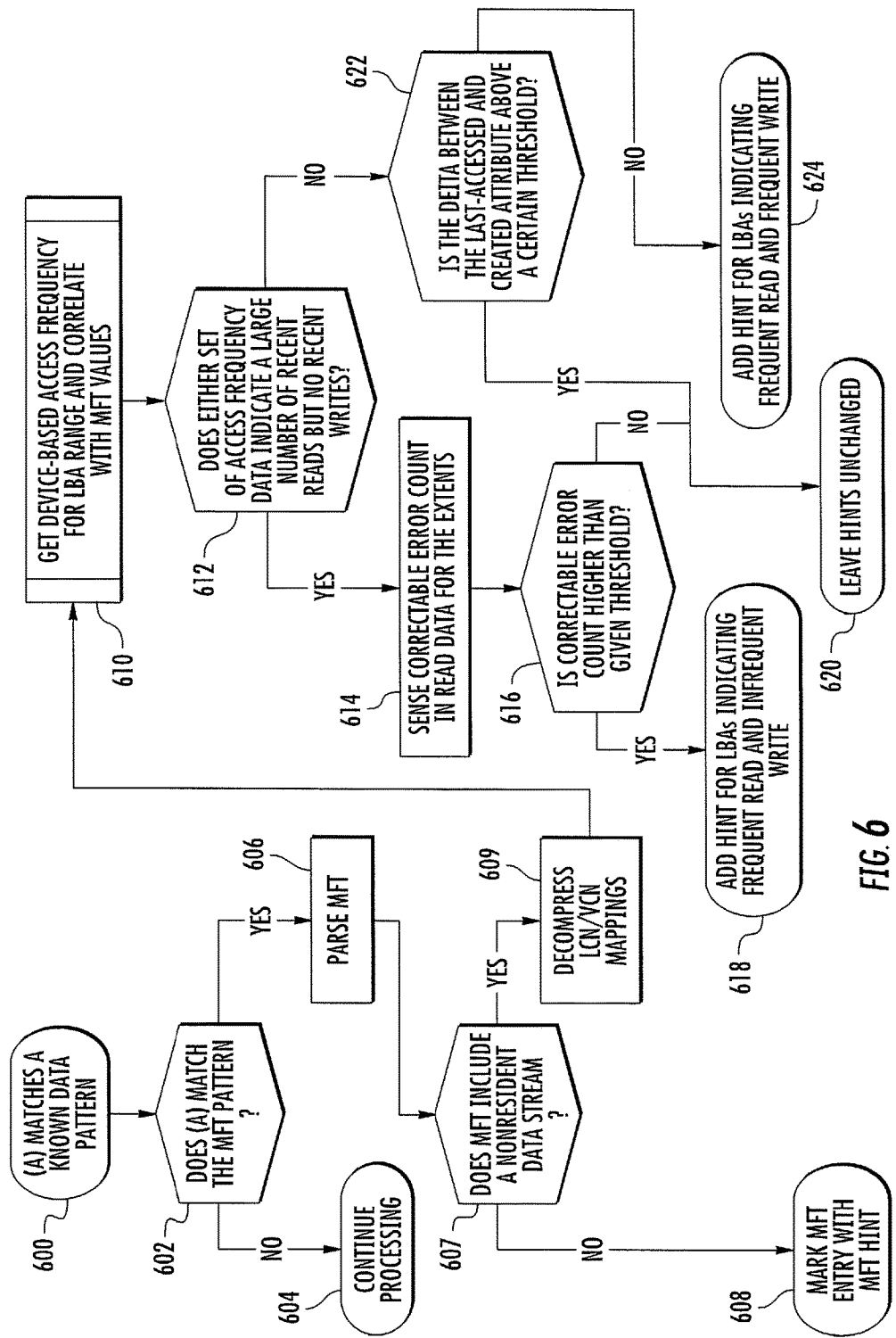
FIG. 6 is a flow chart illustrating an exemplary process for deriving hints from frequently read and frequently accessed attributes in a master file table according to an embodiment of the subject matter described herein.

A frequently read or frequently written hint can be based on combinations of these two inputs, as described below with respect to FIG. 6. Referring to FIG. 6, in step 600 and 602, it is determined whether the file and the data in an I/O request matches the MFT pattern. As described above, the MFT pattern in a Windows file system is the word "FILE". If the file name does not match the MFT pattern, control proceeds to step 604 where additional processing is performed to determine whether the data matches any of the other patterns described above.

If the data in the I/O request matches the MFT pattern, control proceeds to step 606 where the MFT is parsed. Parsing the MFT may include locating the MFT entry corresponding to the I/O operation. In step 607, it is determined whether the MFT entry includes a non-resident data stream. If the MFT entry includes a resident data stream, control proceeds to step 608 where the entry is marked with a hint indicating that the LBA range in the I/O request corresponds to an MFT resident file. If the MFT entry includes a non-resident data stream, control proceeds to step 609 where the LCNNCN mappings are decompressed to determine the locations of the extents that store the non-resident file. Once the LCNNCN mappings are determined, control proceeds to step 610 where the device based access frequency for the LBA range is obtained from the access frequency map and that access frequency is correlated with the MFT attributes that correspond to file access frequency. In step 612, it is determined whether either set of access frequency data indicates the large number of reads but no recent writes. If the access frequency data indicates a large number of reads but no recent writes, control proceeds to step 614 where a correctable error count is sensed in read data for the extents. In step 616, it is determined whether the correctable error count is higher than a given threshold. If the correctable error count is higher than a given threshold, control proceeds to step 618 where a hint is created for the LBAs indicating frequently read and infrequently written. If the correctable error count is not higher than a given threshold, control proceeds to step 620 where the hints associated with the LBA range are left unchanged.

Returning to step 612, if it is determined that either set of access frequency data does not indicate a large number of reads but no recent writes, control proceeds to step 622 where it is determined whether the difference between the last accessed and created attribute is above a threshold. If the last accessed and created attribute is above the threshold, this means that the file is static, and control proceeds to step 618 where the hints are left unchanged. If the difference between last accessed and created attribute is not above the threshold, this means that the file is frequently read and written, so control proceeds to step 624 where a hint is added to the logical block addresses indicating frequently read and frequently written data. As described above, hints that indicate frequently read and frequently written data can be used to place the data in a region of the storage device that contains memory cells with a larger comparative number of remaining program and erase cycles.

Although in the examples illustrated in FIGS. 5 and 6 file system metadata is parsed in the context of an I/O request, the subject matter described herein is not limited to deriving hints from file system metadata in the context of an I/O request. File system metadata constitutes data that is stored in non-volatile memory. Accordingly, such metadata can be parsed independently of I/O operations to derive hints associated with LBA ranges corresponding to files referenced in file system metadata.

In addition, the subject matter described herein is not limited to parsing timestamps and filenames to derive hints. Another type of file system metadata that may be used for hint derivation are file attributes (read only, hidden, system, compressed) that can also be extracted to help with hinting. For example, if a file is marked read only, then it is not likely that the file will be modified and the file can be stored in a static portion of non-volatile memory 106. Similarly, if a file is marked as hidden or system, this typically refers to the file is being a part of the operating system. A file that is part of the operating system is one that is not likely to be modified, so it could also be stored in a static portion of non-volatile memory 106. The file attributes can be combined with any of the attributes or other sources described herein for enhanced hint derivation.

Parsing File System Metadata in Write Requests to Determine Information Regarding Future Host Write Operations The subject matter described herein includes a file system aware scheme that is implemented in a storage device for regulating data writes and other data transfer operations based on knowledge of the layout of the host operating file system to achieve better write performance. The subject matter described herein can be used to support any major file systems that are currently in use or that may be used it the future, for example, in the mobile or non-mobile world, including ext2, ext3, ext4, and others.

The subject matter described herein includes a file system aware scheme in the non-volatile storage device that is designed to regulate writes coming in from the host by implementing a filtering mechanism that distinguishes between file system data (metadata) and between file content and other data. The filtering mechanism is designed to separate access requests for metadata and access requests for other data (such as file content) and filter out the required file system metadata information based on the knowledge of the layout of the file system.

One possible mechanism for implementing the filtering described herein can be based on the knowledge that file systems commonly store superblocks at fixed locations that do not change after file system creation. The superblock records various information about the enclosing file system, such as block counts, inode counts, supported features, maintenance information, and other information. The superblock also contains information about locations of file system metadata in memory. One example of file system metadata that may be located in a superblock is the location of the file system journal log, which contains a log of host write operations that have yet to be performed to the file system.

According to an aspect of the subject matter described herein, the device controller, i.e., the controller of the non-volatile storage device, may analyze the file system metadata to determine to which memory blocks the file system will write host data before the data is actually written to the storage device. This information may be filtered or provided to the device controller for use by the controller in regulating host writes in a more efficient manner. Such information provides the device controller with an indication of to which memory blocks the file system will write the data before the data is actually written to the storage device.

Thus, a device controller of the subject matter described herein may be file system aware in that the controller is capable of organizing data into file system metadata and other content, where the other content includes file data and other data. The other data typically contains the contents of files or user data. Compared to metadata, most user data is less frequently accessed, and each access to user data typically touches data of a larger size. File system metadata typically contains information about the file system, file attributes, and file directories. The file system metadata includes indexes to locations of memory blocks that are scheduled to be written by the file system into the device memory. The indexes are referred to as inodes and are stored in the journal log. The journal log is typically stored in a dedicated area on the non-volatile storage device and contains the indexes to memory blocks containing data file changes and updates that the file system will make in the future. These indexes can be translated into logical block addresses of memory blocks where the host data corresponding to the inodes will be written.

In some file systems, such as ext3 and ext4, there are two possible mechanisms for converting between inodes and logical block addresses. The first mode is a direct-indirect block addressing approach, and the second mode utilizes an extent tree implementation. In the first mode, file block numbers (inode numbers) are mapped to logical block numbers (logical block addresses) by navigating a three level block map. To find a logical block that stores a particular file block, the block map is navigated using the file block number as an index to locate the corresponding logical block number.

In the second mode, file system extents are arranged as a tree. Each node of the tree begins with a structure extent_header. If the node is an interior node, the header is followed by instances of the structure ext4_extent_idx. Each of these index entries points to a block containing one or more nodes in the extent tree. If the node is a leaf node, then the header is followed by extent header entries instances of the structure extent. These instances point to the file system's data blocks. The root node of the extent tree is stored in such a manner that allows for the first four extents to be recorded without the use of extra metadata blocks. Thus, using the second mode where file system extents are arranged as a tree, mapping an inode number to a logical block address may include traversing the extent tree using the inode number as an index until a leaf node is located. The leaf node stores the block number to which a particular file system extent points.

In general, journaling is a file system aware feature in which all data file updates and changes that the file system will make are recorded ahead of time in a journal log and maintained in a dedicated area of the file system before committing the updates to the main file system. The journal log provides an audit trail of the file system associated with memory allocation blocks and host data writes that are defined by the file system. Such information is typically used to reconstruct file system if the original file is damaged or destroyed, so that in the event of a system crash or power failure, such file systems are quicker to bring online and less likely to become corrupted. However, according to an aspect of the subject matter described herein, the proposed file system aware scheme operates to utilize the information in the journal log for efficient data write purposes. In addition, the subject matter described herein utilizes the information in the journal for more efficient handling of internal housekeeping operations within the storage device.

The journal log is typically designed as a table array containing descriptor blocks (DB0, DB1, etc.), which store the transaction ID number, inode information from which LBA addresses have yet to be written blocks by the file system can be calculated, and corresponding commit blocks (CB0, CB1, etc.), indicative of an end of a data write operation.

For example, in the case where the specified data in an incoming host write command is associated with a transaction ID number (e.g., 100) for DB1, then the LBA addresses of the yet to be written memory blocks in the device memory may be calculated from the corresponding inode information within the journal log. The following simplified example illustrates information that may be contained within the journal log:

DB0 inodes CB0
DB1 CB1
DB2 CB2

In the above-listed example, the inodes between DB0 and CB0 can be used to calculate the LBA addresses of memory blocks that are yet to be written to the device.

The following steps illustrate a possible flow for the subject matter described herein:

1. Upon receiving a host write access request of data, differentiate between metadata (file system data) access request and (other data) request.
2. Identify the location of the journal log within the access request for file system metadata by accessing the descriptor block and corresponding inodes information associated with the incoming host write access request. In the ext4 file system, access to journal log is mostly performed with a special inode number which is equal to 8. In any case, file system journal location information can be parsed from superblock information as well. The device controller will check the properties of all data written to this inode. The logical block address (LBA) of this inode is calculated from superblock information.
3. Obtain indexes (inodes) information associated with the descriptor block specified in the incoming host write access request.
4. For the incoming host write access request, calculate the LBA addresses of memory blocks that are yet to be written by the file system in the device memory from their associated indexes (inodes) information in the journal log. The LBA addresses of memory blocks associated with data writes that are yet to be written by the file system are then filtered to the device controller for use by the controller. Such information provides the device controller an indication as to where (i.e. which memory blocks) the file system will write the host data before the data is actually written in the storage device.
5. Then, prepare the device memory array for regulating upcoming host writes according to the identified LBA addresses of yet to be written blocks in the device for efficient data writes purposes. Knowing where (which memory blocks) the file system will write upcoming host data allows the device controller to prepare for upcoming host write operations in various ways, as required. As a result, host write operations are managed by the device controller in the storage device in a more effective way based also on information that is maintained in the journal log within the metadata (file system data), wherein such information is indicative of the memory locations of memory blocks that are yet to be written by the file system.

As stated above, after parsing the file system metadata, the device controller may prepare the storage device for the future write operations identified from the file system metadata. Exemplary preparations that may be performed are as follows:

Making identified LBA addresses of yet to be written memory blocks available, for example, in a continuous manner for upcoming sequential host writes;

Preparing the device for handling burst control operations accordingly, for example, by allocating an available (e.g., continuous) storage partition and device memory;

Handling scheduling of other internal housekeeping operations accordingly, for example, activating or deactivating garbage collection operations (i.e., reclaiming memory locations that are no longer in use) on the identified memory blocks only according to specific configuration, and so on;

Mapping logical memory addresses to physical memory addresses for memory blocks to be written to the device so that the memory blocks will reside on the same memory die, identifying desired memory dies for performing host writes, determining which memory die to perform the host writes so as not to leave undesired holes in the memory array, etc.

According to another aspect of the subject matter described herein, in the case of a file system configuration where the file system of the host is configured not to write host data between a descriptor block and a commit block, the subject matter described herein can be further applicable to utilize the detection of a commit block for more efficient handling of internal housekeeping operations, such as garbage collection and other internal memory management operations within the storage device. For example, currently, garbage collection will be triggered after a large amount of idle time. The receipt of a commit block may be used as a trigger to reduce the wait time for garbage collection.

One advantage of the subject matter described herein includes significantly improved write performance. Another advantage is that the subject matter described herein provides for efficient handling of incoming host writes based on LBA ranges of data blocks that are defined by the file system for host writes before the writes are actually written to the device memory. The subject matter described herein further provides for efficient handling of internal housekeeping operations based on file system information of yet to be written blocks to the device. The subject matter described herein may assist major file systems currently or that will be in use in mobile and other devices, including ext2, ext3, and ext4.

Figure 7:
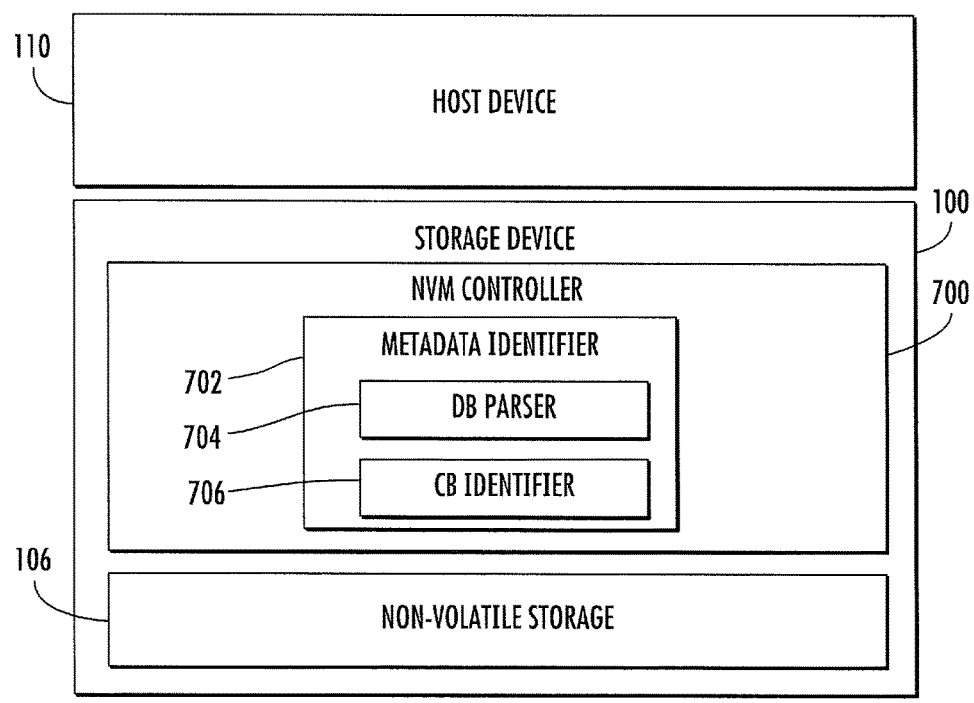
FIG. 7 is a block diagram illustrating a host device and a storage device capable of parsing file system metadata in host write requests and preparing non-volatile memory for future write operations according to an embodiment of the subject matter described herein.

As stated above, according to an aspect of the subject matter described herein, file system metadata in host write requests may be parsed to identify regarding future host write operations and to determine when to perform housekeeping operations. FIG. 7 is a block diagram illustrating a host device and a storage device where the storage device parses file system metadata in host write requests to prepare the storage device for future host write operations and to determine when to perform housekeeping operations on the non-volatile storage device. Referring to FIG. 7, storage device 100, non-volatile memory 106, and host device 110 are described above with respect to FIG. 1. In FIG. 7, storage device 100 includes a device controller 700 that controls access to non-volatile memory 106. Device controller 700 is typically a hardware or firmware component that resides on storage device 100 to interface with host device 110 and control access to non-volatile memory 106. In the illustrated example, device controller 700 includes a metadata identifier 702 which is further divided into a descriptor block (DB) parser 704 and a commit block (CB) identifier 706. Metadata identifier 702 parses host write requests to identify the presence of file system metadata. DB parser 704 locates descriptor blocks in write requests determined to have file system metadata and parses the file system metadata following each descriptor block to determine information regarding future host write operations.

Commit block identifier 706 parses write requests determined to have file system metadata for the presence of a commit block. A commit block signifies the end of a write request. When a commit block is detected, controller 700 may perform housekeeping operations on non-volatile memory 106. An example of a housekeeping operation is garbage collection or other memory management operations.

Figure 8:
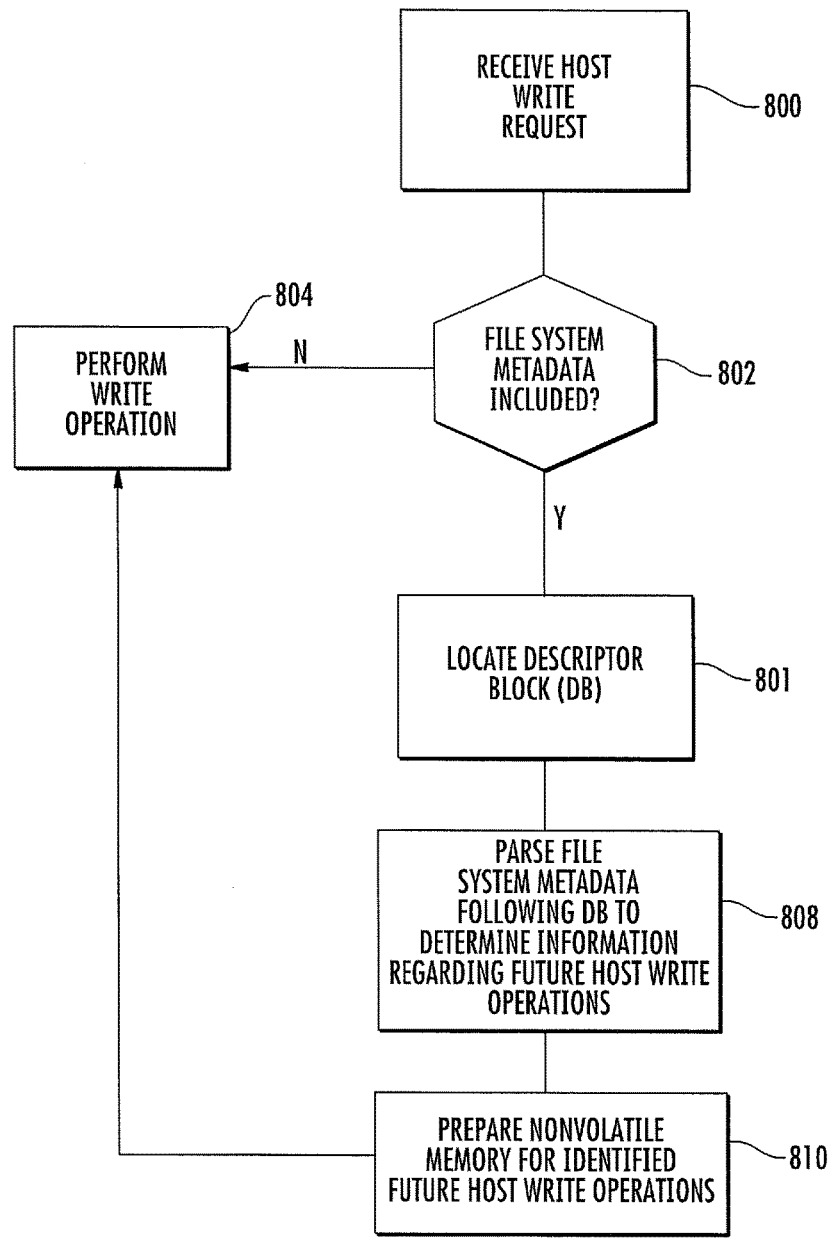
FIG. 8 is a flow chart illustrating an exemplary process implemented by a storage device for parsing file system metadata and for preparing the storage device for future host write operations indicated by the file system metadata according to an embodiment of the subject matter described herein.

Controller 700, based on the file system metadata parsed in the write request, prepares non-volatile memory 106 for future write operations. FIG. 8 illustrates an exemplary process for identifying file system metadata in an incoming write request, parsing the file system metadata, and preparing non-volatile memory 106 for future host write operations based on information determined from file system metadata. Referring to FIG. 8, in step 800, storage device 100 receives a write request. The write request may be passed to device controller 700. In step 802, it is determined whether the write request includes file system metadata. The presence of file system metadata in a write request may be determined based on logical block address (LBA) ranges in a write request that correspond to the memory location where the file system stores a file system journal. Writes to a file system journal include file system metadata because the file system journal is used by the file system to record information about upcoming write operations, such as which inodes or logical block addresses will be written in the future write operations. The purpose of the file system journal is to keep track of file system write that will occur so that the write operations can be replayed using the journal in the event of a system crash. If it is determined that the write request does not include file system metadata, control proceeds to step 804 where controller 700 performs the write operation specified in the write request.

If it is determined that the write request includes file system metadata, control proceeds to step 806 where a descriptor block (DB) is located in the file system metadata. DB parser 704 may locate the descriptor block by looking for predetermined bits that specify a descriptor block. The information following a descriptor block but prior to receiving a commit block contain file system metadata. Accordingly, in step 808, file system metadata following the descriptor block is parsed to identify information regarding future host write operations. Examples of information that may be determined from file system metadata is whether future write operations will be sequential, random, etc. In step 810, the non-volatile memory is prepared for the identified future host write operations. For example, controller 700 may enable burst mode for expected sequential write access patterns, perform urgent housekeeping tasks in preparation for new incoming data, delay copying from single level cells (SLC) to multi-level cells (MLC) when it is determined that the data to be copied will be overwritten by the received user data. After step 810, control proceeds to step 804 where the write operation specified by the write request is performed.

Figure 9:
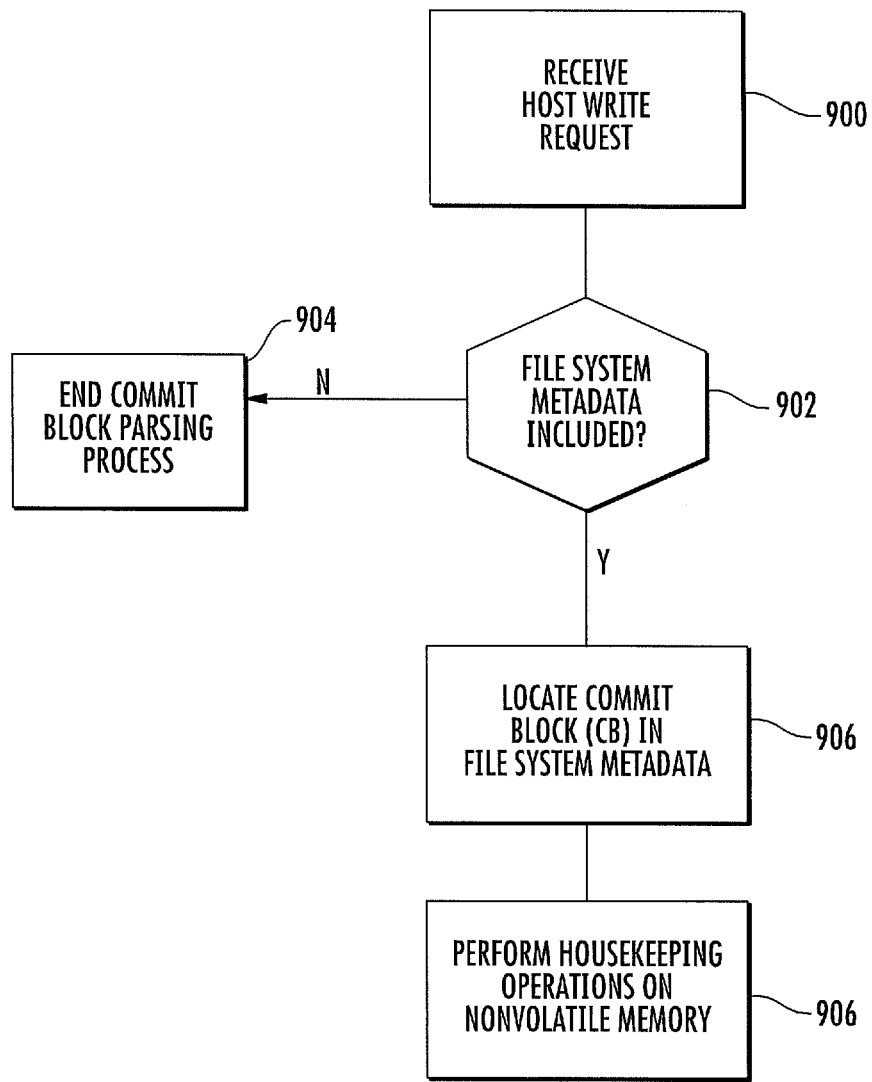
FIG. 9 is a flow chart illustrating an exemplary process implemented by a storage device for parsing file system metadata and determining an optimal time for performing non-volatile storage housekeeping operations according to an embodiment of the subject matter described herein.

According to another aspect of the subject matter described herein, commit blocks in file system metadata may be used to signify a time for performing housekeeping operations on non-volatile memory 106. A commit block signifies the end of a write request and no data will be written to the non-volatile storage device until another descriptor block is received. Accordingly, when a commit block is received, it may be desirable to initiate housekeeping operations, such as garbage collection or other memory management operations. FIG. 9 is a flow chart illustrating an exemplary process for determining when to perform housekeeping operations using file system metadata according to an embodiment of the subject matter described herein. Referring to FIG. 9, in step 900, a write request is received from a host. The write request may be received by controller 700. In step 902, it is determined whether the write request includes file system metadata. If the write request does not include file system metadata, control proceeds to step 904 where the commit block parsing process ends. If the write request includes file system metadata, control proceeds to step 906 where a commit block is located in the file system metadata. The commit block may be identified by parser 704 illustrated in FIG. 7 using predetermined bits that specify a commit block. In step 908, in response to locating the commit block, controller 700 performs housekeeping operations on the non-volatile memory. Examples of housekeeping operations that may be performed include garbage collection and other memory management operations.

The subject matter described herein can be implemented in any suitable NAND flash memory, including 2D or 3D NAND flash memory. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the subject matter described herein is not limited to the two dimensional and three dimensional exemplary structures described but cover all relevant memory structures within the spirit and scope of the subject matter as described herein and as understood by one of skill in the art.

The subject matter described herein includes processing file system metadata in host write requests to determine information about future host write operations. The information regarding future host write operations can be used by a device controller to prepare the non-volatile memory for the future host write operations. For example, the device controller may prepare the non-volatile storage device for future sequential host write access patterns or random host access patterns operations depending on the content of the file system metadata. The file system metadata may also be usable to determine when it is optimal to perform memory management operations.

According to one aspect, the subject matter described herein includes a storage device. The storage device includes a nonvolatile memory. The storage device further includes a metadata identifier for determining whether an incoming write request received from a host system includes file system metadata. The storage device further includes a descriptor block (DB) parser for, in response to a determination that the incoming write request includes file system metadata, locating a descriptor block in the write request and parsing file system metadata following the descriptor block to determine information regarding future host write operations. The storage device further includes a device controller for preparing the nonvolatile memory for the future host write operations based on the information regarding the future host write operations determined from the file system metadata.

According to another aspect of the subject matter described herein, the nonvolatile memory comprises flash memory.

According to another aspect of the subject matter described herein, the flash memory comprises NAND flash memory or NOR flash memory having a two-dimensional or three-dimensional configuration.

According to another aspect of the subject matter described herein, the metadata identifier is configured to identify the presence of file system metadata in the write request based on memory address information determined from the write request.

According to another aspect of the subject matter described herein, the metadata identifier is configured to identify the presence of file system metadata in the write request based on the presence of memory address information that corresponds to the location of a file system journal in the nonvolatile memory.

According to another aspect of the subject matter described herein, the DB parser is configured to determine logical block addresses (LBAs) of memory blocks to be written in the nonvolatile memory from inodes following the descriptor block.

According to another aspect of the subject matter described herein, the storage device further includes a commit block (CB) identifier for identifying a CB in the write request, wherein the device controller is configured to perform memory management operations on the nonvolatile memory after the CB is identified.

According to another aspect of the subject matter described herein, the memory management operations include activating or deactivating garbage collection.

According to another aspect of the subject matter described herein, the DB parser is configured to determine, from the file system metadata, that future sequential host write operations will occur and wherein, in response to the determination that the future sequential host write operations will occur, the device controller is configured to prepare contiguous blocks of the nonvolatile memory for the future sequential host write operations.

According to another aspect of the subject matter described herein, the DB parser is configured to determine, from the file system metadata, that future random host write access patterns will occur.

According to another aspect of the subject matter described herein, the device controller is configured to map logical addresses for the future host write operations to physical addresses associated with a particular memory die or dies to increase the efficiency of utilization of the memory die or dies.

According to another aspect, the subject matter described herein includes a storage device. The storage device includes non-volatile storage. The storage device further includes a hint derivation and memory utilization optimization module for deriving hints regarding accesses to the non-volatile storage and from file system metadata and for utilizing the hints to optimize utilization of the non-volatile storage. The separate device further includes hint table maintained in the non-volatile storage for storing the hints.

According to another aspect, the subject matter described herein includes a storage device. The storage device includes non-volatile storage. The storage device further includes means for determining whether an incoming write request received from a host system includes file system metadata. The storage device further includes means for, in response to a determination that the incoming write request includes file system metadata, locating a descriptor block in the write request and parsing file system metadata following the descriptor block to determine information regarding future host write operations. The storage device further includes means for preparing the nonvolatile memory for the future host write operations based on the information regarding the future host write operations determined from the file system metadata.

According to another aspect, the subject matter described herein includes a method for using file system metadata to enhance utilization of nonvolatile memory. The method includes in a nonvolatile memory device having nonvolatile memory: determining whether an incoming write request received from a host system includes file system metadata; and in response to a determination that the incoming write request includes file system metadata:locating a descriptor block in the write request; parsing file system metadata following the descriptor block; identifying, from the file system metadata, memory addresses of future host write operations; and preparing the nonvolatile memory for the future host write operations based on the file system metadata.

According to another aspect of the subject matter described herein, the nonvolatile memory comprises flash memory.

According to another aspect of the subject matter described herein, the flash memory comprises NAND flash memory or NOR flash memory having a two-dimensional or three-dimensional configuration.

According to another aspect of the subject matter described herein, identifying the presence of file system metadata in the write request comprises identifying the presence of file system metadata based on memory address information determined from the write request.

According to another aspect of the subject matter described herein, identifying the presence of file system metadata in the write request includes identifying memory address information that corresponds to the location of a file system journal in the nonvolatile memory.

According to another aspect of the subject matter described herein, identifying memory addresses of the future write operations includes identifying logical block addresses (LBAs) of memory blocks to be written in the nonvolatile memory from inodes following the descriptor block.

According to another aspect of the subject matter described herein, the method for using file system metadata to enhance utilization of nonvolatile memory includes identifying a commit block (CB) in the write request, and performing memory management operations on the non-volatile memory after the CB is identified.

According to another aspect of the subject matter described herein, the memory management operations include activating or deactivating garbage collection.

According to another aspect of the subject matter described herein, the method for using file system metadata to enhance utilization of nonvolatile memory includes determining, from the file system metadata, that future sequential host write operations will occur and, in response to determining that the future sequential host write operations will occur, preparing contiguous blocks of the nonvolatile memory for the future sequential host write operations.

According to another aspect of the subject matter described herein, the method for using file system metadata to enhance utilization of nonvolatile memory includes determining, from the file system metadata, that future random host write access patterns will occur.

According to another aspect of the subject matter described herein, the method for using file system metadata to enhance utilization of nonvolatile memory includes mapping logical addresses for the future host write operations to physical addresses associated with a particular memory die or dies to increase the efficiency of utilization of the memory die or dies.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

Any of the methods or systems described herein may be combined with each other. For example, any of the hint derivation methods or systems (or components thereof) described herein may be combined with the descriptor block and commit block parsing methods or systems (or components thereof) described herein.

It will be understood that various details of the subject matter described herein may be changed without departing from the scope of the subject matter described herein. Furthermore, the foregoing description is for the purpose of illustration only, and not for the purpose of limitation.

What is claimed is:

1. A storage device comprising:
   nonvolatile memory; and
   a controller operably coupled to the nonvolatile memory and configured to:
   determine that an incoming write request received from a host system includes host file system metadata based on a write address of the incoming write request corresponding to an address range for host file system metadata stored on the nonvolatile memory;
   in response to determining that the incoming write request includes host file system metadata, locate the host file system metadata within data to be written to the nonvolatile memory by the incoming write request;
   parse the host file system metadata located within the data to be written to the nonvolatile memory by the incoming write request to determine a future write address for a future host write operation, the future write address different from the write address of the incoming write request, wherein determination of the future write address includes parsing metadata indexes to locations of memory blocks that are scheduled to be written to by the host file system in the nonvolatile memory; and
   prepare the storage device for the future host write operation based on the future write address determined by parsing the host file system metadata of the incoming write request.

2. The storage device of claim 1, wherein the nonvolatile memory comprises flash memory.

3. The storage device of claim 2, wherein the flash memory comprises NAND flash memory or NOR flash memory having a two-dimensional or three-dimensional configuration.

4. The storage device of claim 1, wherein the controller is further configured to identify a descriptor block in the incoming write request and to parse host file system metadata in data following the identified descriptor block in the incoming write request.

5. The storage device of claim 1, wherein the controller is further configured to determine that the incoming write request comprises host file system metadata in response to determining that the write address of the incoming write request corresponds to a file system journal.

6. The storage device of claim 1, wherein the future write address comprises a logical block address determined from the indexes to locations of memory blocks, the indexes further comprising an inode following a descriptor block in the host file system metadata included in the incoming write request.

7. The storage device of claim 1, wherein the controller is further configured to perform a memory management operation on the nonvolatile memory in response to a request to store a commit block (CB) on the nonvolatile memory.

8. The storage device of claim 7, wherein the memory management operation comprises a garbage collection operation.

9. The storage device of claim 1, wherein the controller is further configured to prepare contiguous blocks of the nonvolatile memory for the future host write operation in response to determining that the future host write operation comprises a sequential write.

10. The storage device of claim 1, wherein the controller is further configured to determine, from the host file system metadata, a future random host write access pattern corresponding to the future host write operation.

11. The storage device of claim 1, wherein the controller is further configured to map logical addresses of the future host write operation to physical addresses associated with a particular memory die or dies to increase the efficiency of utilization of the memory die or dies.

12. A system, comprising:
   a nonvolatile storage;
   means for determining that a data payload of an incoming write request received from a host system includes host file system metadata in response to locating a descriptor block of the host file system metadata within the data payload, the data payload comprising data to be written to the nonvolatile storage in a host write operation;
   means for identifying address information pertaining to a future write operation within the data payload of the incoming write request, the identified address information following the descriptor block of the host file system metadata located within the data payload of the incoming write request and being different from address information for the host write operation of the incoming write request, wherein identifying the address information pertaining to the future write operation includes parsing metadata indexes to locations of memory blocks that are scheduled to be written to by the host file system in the nonvolatile storage; and means for preparing the nonvolatile storage for the future write operation based on the address information regarding the future host write operation identified within the host file system metadata of the incoming write request.

13. A method, comprising:

in a nonvolatile memory device having nonvolatile memory:

detecting a write request comprising host file system metadata, the detecting comprising:

determining that a write address associated with the write request is within a determined logical address range; and locating a descriptor block of the host file system metadata within data to be stored on the nonvolatile memory in response to the detected write request;

parsing the host file system metadata following the descriptor block located within the data to be stored on the nonvolatile memory in response to the detected write request, wherein parsing the host file system metadata comprises:

identifying an address of a future host write operation within the host file system metadata within the data to be stored on the nonvolatile memory in response to the detected write request, the identified address different from the determined write address associated with the detected write request, wherein identifying the address of the future write operation includes parsing within metadata indexes to locations of memory blocks that are scheduled to be written to by the host file system in the nonvolatile memory; and preparing the nonvolatile memory for the future host write operation based on the identified addresses.

14. The method of claim 13, wherein the nonvolatile memory comprises flash memory.

15. The method of claim 14, wherein the flash memory comprises NAND flash memory or NOR flash memory having a two-dimensional or three-dimensional configuration.

16. The method of claim 13, wherein detecting the write request comprises determining that the write address associated with the detected write request corresponds to host file system metadata stored within the nonvolatile memory device.

17. The method of claim 13, wherein the address associated with the detected write request corresponds to a file system journal.

18. The method of claim 13, wherein identifying the address of the future write operation comprises identifying a logical block address (LBA) of a memory block to be written in the nonvolatile memory from the indexes to locations of memory blocks, the indexes further comprising an inode following the descriptor block in the host file system metadata of the detected write request.

19. The method of claim 13, further comprising performing a memory management operation on the nonvolatile memory in response to receiving a request to write a commit block (CB) to the nonvolatile memory device.

20. The method of claim 19, wherein the memory management operation comprises one of activating garbage collection and deactivating garbage collection.

21. The method of claim 13, wherein:

the future host write operation comprises a sequential write; and preparing the nonvolatile memory for the future host write operation comprises preparing contiguous blocks of the nonvolatile memory for the sequential write.

22. The method of claim 13, further comprising determining, from the host file system metadata of the detected write request, an access pattern corresponding to the future host write operations.

23. The method of claim 13, further comprising mapping logical addresses for the future host write operations to physical addresses associated with a particular memory die or dies to increase the efficiency of utilization of the memory die or dies.

24. A non-transitory, computer-readable storage medium comprising instructions configured to cause a storage device to perform operations, the operations comprising:

receiving an incoming write request from a host, the incoming write request including data to be written to the storage device;

determining that the incoming write request pertains to one or more future host write requests, the future host write requests to be received at the storage device after the incoming write request, wherein the determining comprises:

locating a descriptor block within the data included within the incoming write request, and parsing file system metadata following the descriptor block located within the data included within the incoming write request, the parsing comprising extracting an address corresponding to the one or more future host write requests, the extracted address different from a destination address for the data included in the incoming write request, wherein extracting the address corresponding to the one or more future host write request includes parsing within metadata indexes to locations of memory blocks that are scheduled to be written to by the host file system in the storage device; and preparing the storage device to service the one or more future host write requests in response to extracting the address from the incoming write request, wherein preparing the storage device comprises one or more of:

allocating the extracted address for the one or more future write requests, preparing contiguous memory blocks for the one or more future write requests, deactivating garbage collection on the storage device, and selecting a memory die for the one or more future host write operations, such that each of the one or more future host write operations corresponds to a same memory die.

25. The method of claim 13, wherein preparing the nonvolatile memory for the future host write operations further comprises making identified logical block addresses (LBAs) of scheduled to be written memory blocks available in a continuous manner for upcoming sequential write requests.

26. The method of claim 13 further comprising:
preparing the nonvolatile memory for burst control operations by allocating an available storage partition in the nonvolatile memory.

27. The method of claim 13, further comprising one of activating a garbage collection operation and deactivating a garbage collection in the nonvolatile memory.

28. The method of claim 13, further comprising:
mapping logical block addresses to physical block addresses for memory blocks scheduled to be written to in the nonvolatile memory where the memory blocks reside on a same memory die.

29. The method of claim 13, further comprising:
selecting at least one memory die in the nonvolatile memory for memory blocks scheduled to be written to in the nonvolatile memory to eliminate holes of memory blocks in a memory array in the nonvolatile memory.

* * * * *